United States Patent [19]

Walls

[11] Patent Number: 5,163,148
[45] Date of Patent: Nov. 10, 1992

[54] FILE BACKUP SYSTEM FOR PRODUCING A BACKUP COPY OF A FILE WHICH MAY BE UPDATED DURING BACKUP

[75] Inventor: Keith Walls, Hudson, N.H.

[73] Assignee: Digital Equipment Corporation, Maynard, Mass.

[21] Appl. No.: 392,419

[22] Filed: Aug. 11, 1989

[51] Int. Cl.$^5$ .................... G06F 7/00; G06F 12/16
[52] U.S. Cl. ............................ 395/600; 364/DIG. 1; 364/222.82; 364/268; 364/268.2; 364/285.1; 395/575
[58] Field of Search ............ 364/200, 900, DIG. 1; 395/600, 575

[56] References Cited

U.S. PATENT DOCUMENTS

| | | | |
|---|---|---|---|
| 4,654,819 | 3/1987 | Stiffler et al. | 364/900 |
| 4,686,620 | 8/1987 | Ng | 364/200 |
| 4,710,870 | 12/1987 | Blackwell et al. | 364/200 |
| 4,805,095 | 2/1989 | Armstrong et al. | 364/200 |
| 5,043,871 | 8/1991 | Nishigaki et al. | 364/200 |

*Primary Examiner*—Eddie P. Chan
*Attorney, Agent, or Firm*—Fish & Richardson

[57] ABSTRACT

A new file backup system facilitates backup of a file while it is being updated. The file header includes a set of flags which synchronize the backup operation. After the backup operation has begun, if a portion of the file being backed up requires updating, the portion of the original file to be updated is maintained in the digital data processing system. The backup control program performing the backup backs up the file, substituting the original portions for portions that have been updated. Since the updated portions of the file are maintained during backup, the file can be accessed and updated while the backup operation is taking place.

16 Claims, 5 Drawing Sheets

FILE BACKUP SYSTEM FOR PRODUCING A BACKUP COPY OF A FILE WHICH MAY BE UPDATED DURING BACKUP

FIELD OF THE INVENTION

The invention relates generally to the field of digital data processing systems, and more specifically to a system for producing a backup copy of a data file in a digital data processing system to ensure that the backup copy of the file is in a consistent and known state even though the contents of the file may be updated during the backup operation.

BACKGROUND OF THE INVENTION

A digital data processing system includes three basic elements, namely, a processor element, a memory element and an input/output element. The memory element stores information in addressable storage locations. This information includes data and instructions for processing the data. The processor element fetches information from the memory element, interprets the information as either an instruction or data, processes the data in accordance with the instructions, and returns the processed data to the memory element for storage therein. The input/output element, under control of the processor element, also communicates with the memory element to transfer information, including instructions and data to be processed, to the memory, and to obtain processed data from the memory.

Typically, an input/output element includes a number of diverse types of units, including video display terminals, printers, interfaces to the public telecommunications network, and secondary storage subsystems, including disk and tape storage devices. A video display terminal permits a user to run programs and input data and view processed data. A printer permits a user to obtain processed data on paper. An interface to the public telecommunications network permits transfer of information over the public telecommunications network.

Secondary storage subsystems perform several functions. Typically, the amount of information which can be stored in the memory element is limited because of cost and reliability considerations. Secondary storage subsystems, particularly disk storage devices, provide mass storage of substantially greater amounts of information than can be accommodated in the memory element. When the processor needs access to information which is stored on a disk storage device, but which is not in the memory, the processor enables the information to be transferred from the disk storage device to the memory. To make room in memory for the information, the processor may also have to enable information in the memory to be stored on a disk storage device.

A disk storage system also provides the additional benefit that, unlike current memories, the storage is non-volatile. That is, in current memories, when power is turned off, the information is lost, whereas in a disk storage system, when power is turned off, the information stored therein is not lost. This is a result of the fact that information in current memories is represented by an electrical charges which dissipate when the power is turned off, whereas information stored in disk storage systems is represented by magnetic fields which are unaffected when power is turned off. In addition, depending on the type of disk storage system, the disk which actually holds the information may be removable; thus, an operator may remove one disk and substitute another to load new information into the digital data processing system.

To protect against the loss of information in the event of a failure in the disk storage system, typically a system operator periodically backs up the information stored therein onto another disk storage device or a tape storage device. Thus, in the event of corruption of information stored on a disk, the information can be recovered.

More specifically, typically information stored in disk storage systems is organized in files, and, during backup, an entire file is backed up. However, during the backup operation, depending on the nature of the processing, it may be desirable to permit the information in the file to be used and updated. For example, if the digital data processing system is used in a bank to record transactions and update accounts, bank customers and employees must have timely access to an account's records. Access to the information in a file containing the records cannot be delayed to accommodate the system's backup requirements. In the past, backups have been scheduled to be performed at times to try to minimize effects on the demands of customers and employees. However, even at these times other processing is often required because of the volume of prior transactions.

In order to make useful backups of files, the files must be brought to a consistent state. This may be illustrated by the following example. Currently, a system called Recovery Unit Journaling is used to record the processing status of transactions and enable recovery in the event backup copies of files need to be used. A Recovery Unit is a single operation which may be presented as multiple transactions, one in connection with each of many accounts. For example, a check may be reflected as two transactions, one to add the amount of the check to the balance of the account of the payee, and the second to substract the amount of the check from the balance of the account of the drawer of the check. Each transaction has an associated flag whose set or reset condition indicates whether the transaction has been reflected in both files containing the balance information.

In processing each transaction, the digital data processing system first tests the transaction flag, and, if it is, for example, set, adds the check amount to, or subtracts it from, the relevant account balance, and then resets the flag to indicate that the transaction has been completed. If the digital data processing system initiates a backup operation between the time the check amount is added to or subtracted from the respective account balances, and the conditioning of the respective flags to indicate that the processing had taken place, the backup copies would erroneously not reflect the fact that the processing had taken place.

SUMMARY OF THE INVENTION

The invention provides a new and improved system for initiating and performing backup operations in connection with files in a digital data processing system.

In brief summary, the new system includes a backup control program, a file management system and an extent map that identifies the storage locations in a digital data processing system in which the various portions of a file are stored. To initiate a backup operation, the backup control program initially requests that the file be brought to a consistent state, after which the file management system brings the file to a consistent state. The backup control program may then begin backing up the file using the information in the extent map to identify the locations of the various portions of the file.

After the file management system brings the file to a consistent state, if it needs to update a portion of the file it maintains the original portion, that is, the portion as it existed at the time the file was brought to a consistent state, in the portion being updated in storage locations in the digital data processing system and updates the extent map to identify the storage locations of portions including both the original and updated data. As the backup control program creates a backup copy of the file, it uses the extent map to identify the storage locations of the various original portions of the file. Since the file management program maintains, during updates, the original portions of the file as they existed at the time the file was brought to a consistent state, the backup control program can make a backup copy of the file using those portions, the backup copy corresponding to the file as it existed at the time it was brought to the consistent state.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
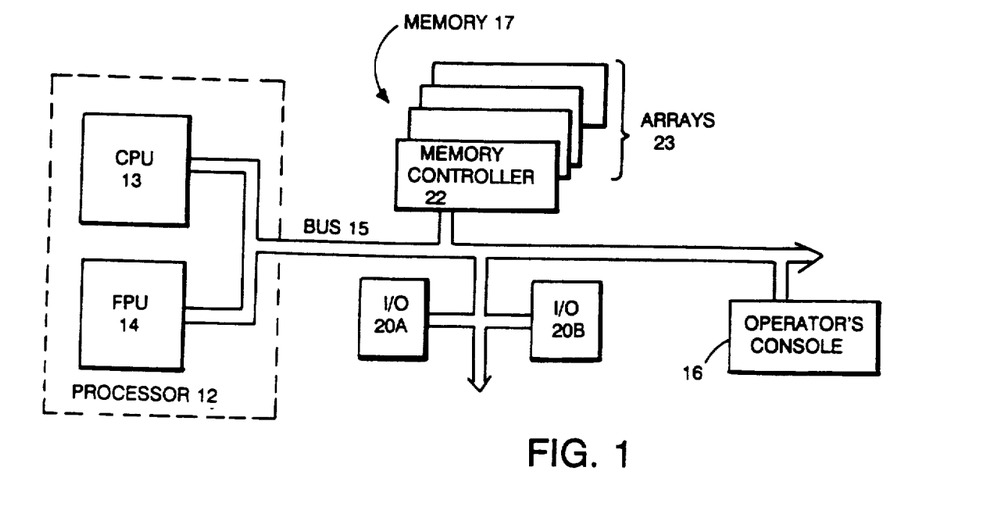
FIG. 1 is a general block diagram of a digital data processing system including the invention.

Referring to FIG. 1, a digital data processing system including the invention includes a processor 12 which includes a central processing unit 13 and a floating point accelerator processor 14 interconnected by a bus 15. Bus 15 serves as the input/output bus of the processor 12, permitting it to communicate with a console 16, a memory 17, one or more input/output units 20A and 20B (generally identified by reference numeral 20). The central processor unit 13 executes instructions that are stored in addressable storage locations in the memory 17. The instructions identify operations that are to be performed on operands, which are also stored in addressable locations in the memory 17. The instructions and operands are fetched by the central processor unit 13 as they are needed, and processed data are returned for storage in the memory 17. The central processor unit 13 also transmits control information to the input/output units 20, enabling them to perform selected operations, such as transmitting data to or retrieving data from the memory 17. Such data may include instructions or operands which may be transmitted to the memory 17 or processed data which is retrieved from the memory 17 for storage or display.

As is typical, the floating point processor is an option and need not be present in a digital data processing system or processor 12 constructed in accordance with the invention. The floating point processor 14 includes circuits which are optimized for processing instructions on selected types of data, namely data in floating point formats. Typically, the central processor unit 13 can process the same data, but it requires more time to perform the processing.

An operator's console 16 serves as the operator's interface. It allows the operator to examine and deposit data, halt the operation of the central processor unit 13 or step the central processor unit 13 through a sequence of instructions and determine the responses of the central processor unit 13 in response thereto. It also enables an operator to initialize the system through a bootstrap procedure, and to perform various diagnostic tests on the entire data processing system.

The memory 17 includes a memory controller 22, which is connected directly to the bus 15 and to a plurality of arrays 23. The arrays 23 contain a plurality of addressable storage locations in which information is stored. The memory controller 22 receives transfer requests from the central processor unit 13 or an input/output unit 20 over the bus 15. Several types of transfer requests may be transmitted over bus 15, which fall into two general categories. In one category, information is written into, or stored in, a storage location, and in the other category, information is retrieved, or read, from a storage location, the storage location being identified by an address transmitted with the transfer request.

The digital data processing system depicted in FIG. 1 may include several types of input/output units 20, including disk and tape secondary storage units, teletypewriters, video display terminals, line printers, telephone and computer network interface units, and the like. The disk secondary storage units may provide mass storage of data which, under control of central processor unit 13, is transferred to and from the memory 17. As is conventional, each disk in a disk secondary storage unit has a magnetic storage medium on one or both of its disk surfaces. Each disk is divided into a plurality of concentric tracks, which are located at differing radial distances from the disk center, and sectors, which define differing angular portions of a disk surface. Each disk storage location is identified by the disk identification, the track identification and the sector identification.

As is also conventional, the digital data processing system depicted in FIG. 1 stores data in the form of files. One embodiment of the invention, which is used in connection with a VAX ® computer system manufactured by Digital Equipment Corporation, the assignee of this application, running the VMS ® operating system, includes, as a part of the operating system, a Record Management Services program, which manages the data files in connection with requests from applications programs. The Record Management Services program provides three types of file organizations, namely a sequential file organization, an indexed file organization, and a relative file organization. The diverse types of file organizations are described in H. Deitel, An Introduction to Operating Systems, (Addison Wesley 1984) at pages 523 through 526, and will not be described in more detail herein.

Figure 2:
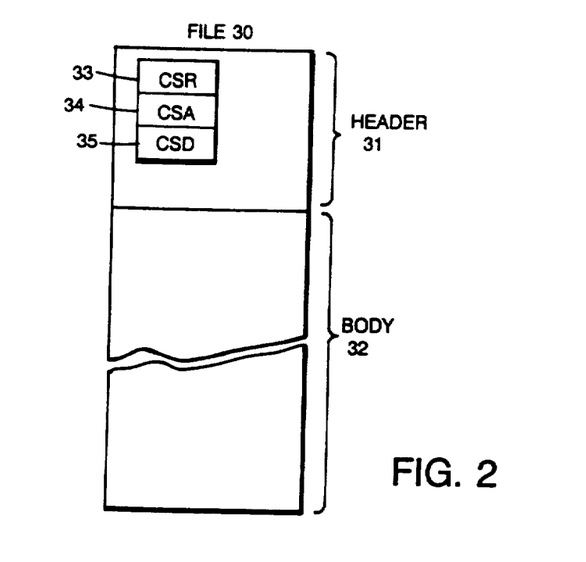
FIGS. 2 and 3 are diagrams depicting data structures which are useful in understanding the invention.

The general structure of a data file is depicted in FIG. 2. With reference to FIG. 2, a file 30 includes a header 31 and a body 32. Generally, the body 32 contains the actual data maintained in the file. Depending on the file organization, the body 32 may also include pointers or other organizing information for assisting in locating data within the body 32. The header 31 includes information about the file, including a file name, organization, the size, the starting disk storage location and other conventional information. In addition, in accordance with the invention, the header includes three flags, namely, a consistent state requested flag 33, a consistent state achieved flag 34 and a consistent state done flag 35. The use of these flags 33 through 35 will be described in more detail below in connection with FIGS. 4A through 4C. Generally, however, they are used to synchronize backup operations in connection with the file 30.

Files are divided into blocks for storage on one or more disks. A file management system manages the blocks comprising a file on the disks. As described above, the header 31 in a file 30 (FIG. 2) includes information as to the disk which contains at least the beginning of the file 30. The file management system maintains on a disk a directory of files, which includes, for each file 30 which is at least partially stored thereon, the identification of an extent map 40, described below in connection with FIG. 3, which details, by tracks and sectors, the storage locations on the disk in which sequential portions, or "file extents" are stored. In addition, if the file 30 extends to another disk, the directory contains a pointer which identifies the disk which contains the next portion of the file. The directory may also contain a pointer which identifies the disk which contains the previous portion of the file.

Figure 3:
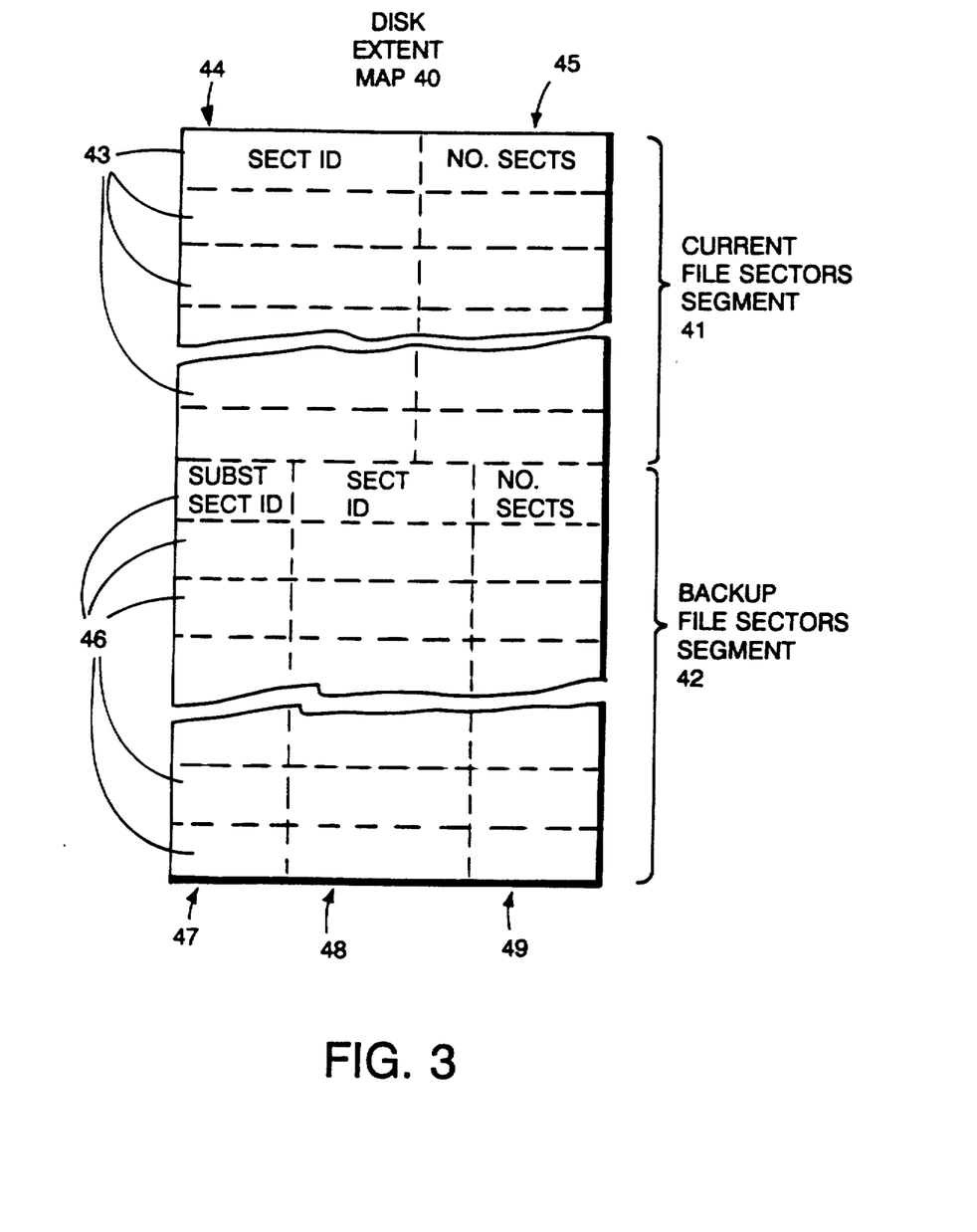

With reference to FIG. 3, the extent map includes a current file sectors segment 41 and a backup file sectors segment 42. The current file sectors segment 41 includes one or more entries 43 each having two fields, namely a sector identification field 44 and a field 45 identifying a number of sectors. Each entry 43 in the current file sectors segment 41 identifies the location of a file extent on the disk, that is, a series of sequential storage locations on the disk containing the file extent. The sector identification field 44 identifies, by track and sector, storage location on the disk containing one extreme end of the file extent and field 45 identifies the number of consecutive storage locations, starting at the storage location identified in field 44, which contain the the file extent. The series of entries 43 in the current file sectors segment 41 of the extent map 40 thus identifies series of sequential storage locations which contain the file extents comprising the file 30, with the file extents being listed in the order in which the file extents are stored in the file 30.

The backup file sectors segment 42 also contains one or more entries 46 each containing several fields. An entry 46 in the backup file sectors segment 42 includes a substitute sector identification field 47, a sector identification field 48 and a field 49 which identifies a number of sectors. Briefly, if, during a backup operation in connection with a file, a file extent requires updating, and if the file extent has not been updated since the beginning of the backup operation, the file extent may be copied from its current storage locations on the disk to other storage locations and appropriate entries 46 inserted into the backup file sectors segment 42 of the disk extent map 40 to identify the storage locations containing the blocks. In addition, each entry 46 contains information identifying a file extent 43 defined in the current file sectors segment 41 to thereby indicate that the file extent identified in entry 43 is an update of the file extent identified in entry 46.

Specifically, in each entry 46 in backup file sectors segment 42, the substituted sectors identification field 47 identifies the original track and sector of the beginning of the file extent that was copied elsewhere, the sector identification field 48 identifies the track and sector of the storage location containing the beginning of the file extent, and the number of sectors filed 49 identifies the number of consecutive sectors containing the file extent. During a backup operation, as will be explained below in connection with FIG. 4C, the backup control program creates a backup copy of the file using the data primarily in the disk storage locations identified by the entries in the current file sectors segment 41, but when file extents are identified by entries in the backup file sectors segment 42, those portions are used instead of corresponding portions identified in the current file sectors segment 41, which contain updated data. Thus, the file 30 can be updated during a backup operation, but backup will proceed using the file as it existed at the time that the backup operation commenced.

It will be appreciated that, if, during an update operation, the file management system only need update a portion of an existing file extent on the disk as identified by an entry 43 in the current file sectors segment 41, it need not copy the entire original file extent to another storage location before creating the update. Instead, the file management system may divide the file extent as identified by the entry 43 into a plurality of file extents, each identified by an entry 43, with one of the file extents being the portion of the original file extent requiring updating. The file management system then copies only the file extent requiring updating to another storage location on the disk and inserts an appropriate entry 46 into the backup file sectors segment 42.

Figure 4A:
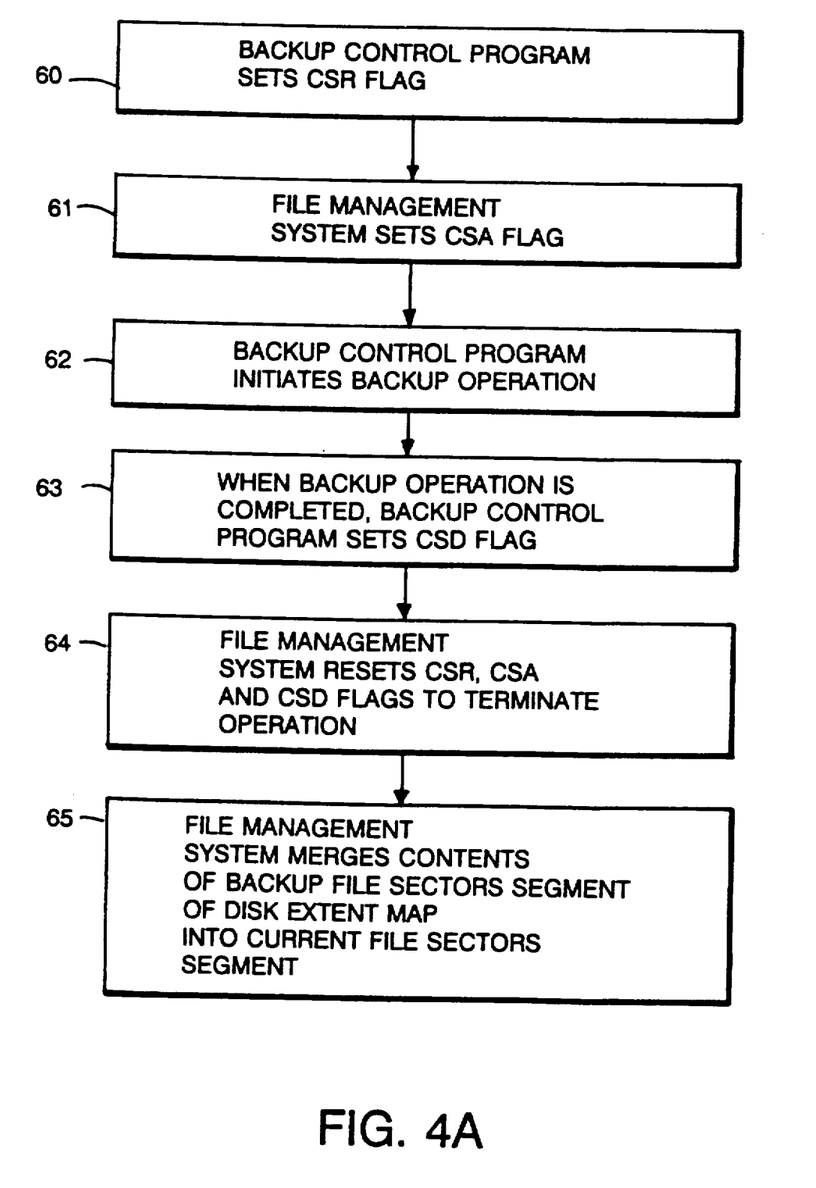
FIGS. 4A, 4B, and 4C are flow diagrams useful in understanding the invention.
Figure 4B:
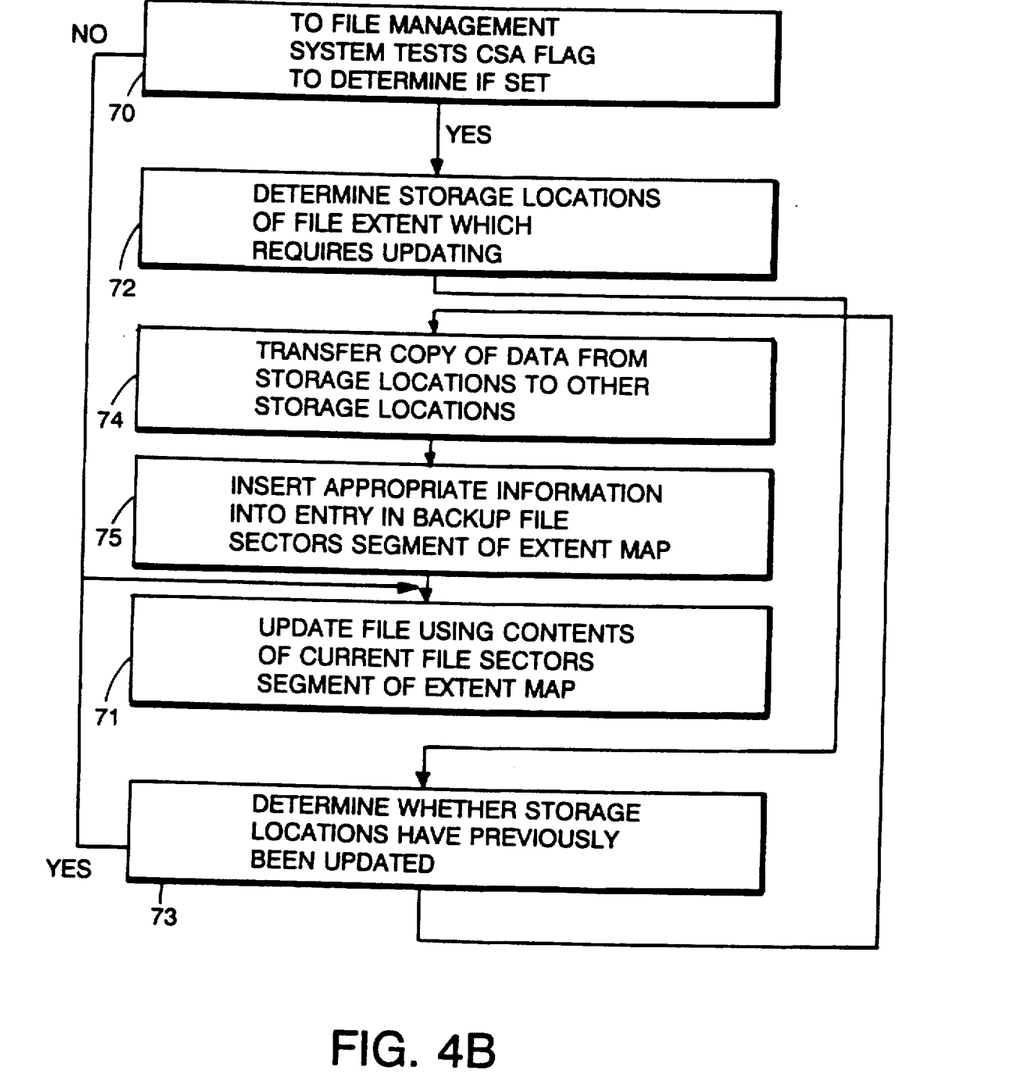
Figure 4C:
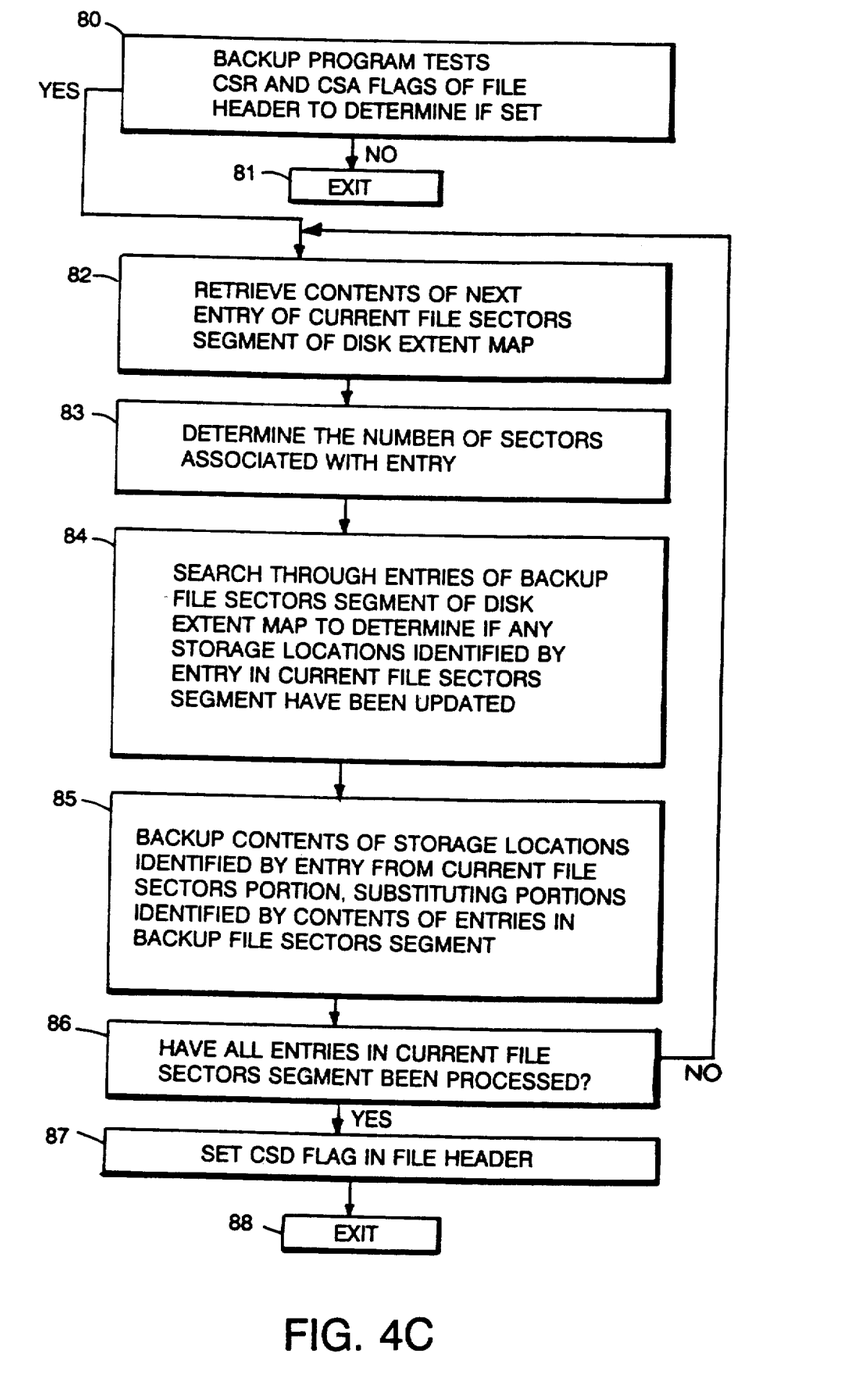

The operations of the digital data processing system in connection with backup operations will be described in connection with FIGS. 4A through 4C. FIG. 4A depicts the backup synchronization using the consistent state requested flag 33 (FIG. 2), consistent state achieved flag 34 and consistent state done flag 35. FIG. 4B depicts operations performed by the file management system in connection with updating a file using flags 33 and 34. FIG. 4C depicts operations performed by a backup control program in connection with a file backup, using flags 33, 34 and 35 and the extent map 40.

With reference to FIG. 4A, when the digital data processing system determines that a file is to be backed up, a backup control program is invoked. The digital data processing system may determine that a file should be backed up using any conventional criterion. In some systems, the backup may be initiated by an explicit command from an operator through the operator's console. In other systems, the operating system may initiate backup of all files on a periodic basis, for example, daily or weekly. The operating system, either periodically or on command from an operator, invokes a backup control program to actually perform the backup operation. In any event, the backup control program first sets the consistent state requested flag 33 (step 60).

Thereafter, the file management system performs any necessary operations required for the file 30 to be in a consistent state. For example, if multiple operations are required in connection with a transaction to bring the file into a consistent state, the file management system ensures that all of the operations are performed. The file management system then sets the consistent state achieved flag 34 (FIG. 2) in the file header 31 of the file 30 (step 61).

After the consistent state achieved flag 34 is set, the backup control program initiates a backup operation (step 62). Typically, files are backed up onto storage media, whether another disk or a tape, which may be removed from the digital data processing system and stored in an external location. While the file is being backed up, the file management system may continue updating the file as necessary using the operations depicted in FIG. 4B to retain records of the original data for the backup. In performing the backup, the backup control program performs the operations generally depicted in FIG. 4C to accommodate update operations. Following the backup operation, the backup control program sets the consistent state done flag 35 indicating that the operations were completed (step 63). The file management system may then reset the consistent state requested flag 33, the consistent state achieved flag 34 and the consistent state done flag 35 (FIG. 2) (step 64) and, if necessary, merge the information of the backup file segment 42 of the disk extent map 40 into the current file segment (step 65) to ensure that the current file sectors segment 41 accurately describes the file on the disk.

After the consistent state achieved flag 34 (FIG. 2) in the header 31 of a file 30 is set indicating that the backup control program may initiate a backup operation in connection with the file, the file management system may continue to update the file 30. The file management system performs the operations depicted in FIG. 4B to preserve the condition of the file when the consistent state done flag 24 was set. With reference to FIG. 4B, the file management system tests the consistent state achieved flag 34 to determine if it is set (step 70). If the consistent state achieved flag is not set, the file management system may update the file in its normal manner. That is, the file management system sequences to step 71 to update the file, using the contents of the current file sectors segment 41 (FIG. 3) of the disk extent map 40 to locate the segment of the file to be updated.

If, on the other hand, the file management system determines, in step 70, that the consistent state achieved flag 34 in the file 30 being updated is set, it sequences to step 72. In step 72, the file management system identifies the file extent which requires updating and, using the entries in the current file sectors segment 41 of the extent map 40, the particular storage locations, that is, the tracks and sectors, on the disk which are to be updated. Prior to storing the update information in those storage locations on the disk, the file management system determines whether the contents of the storage locations have been updated since the consistent state achieved flag 34 was set (step 73). The file management system may use the contents of the backup file sectors segment 42 to determine whether the contents of the file extent being updated has been updated since the setting of the consistent state achieved flag 34. If the file management system determines that the file extent has previously been updated, then the contents do not comprise file extents of the file at the time the consistent state achieved flag 34 was set, and so it need not copy the contents of the storage locations to be updated to other locations on the disk. Accordingly, the file management system sequences to step 71 to update the file.

If, on the other hand, the file management system determines in step 73 that the file extent has not previously been updated, it copies the contents of the storage locations to be updated to other locations (step 74), and inserts appropriate information into an entry 64 in the backup file sectors segment 42 of the extent map 40 (step 75). The information inserted into the entry 46 in the backup file sectors segment 42 of the extent map 40 identifies the storage location in the file of which the data is a copy, in field 47, the location of the copy in field 48 and the number of storage locations containing the copy in field 49. The file management system then sequences to step 71 to perform the file update.

The operations performed by the backup control program in connection with a file backup are depicted in FIG. 4C. With reference to FIG. 4C, the backup control program first tests the conditions of the consistent state requested flag 33 and consistent state achieved flag 34 to determine if they are set (step 80). If they are not both set, the backup control program may exit (step 81) or repeat step 80 until they are both set. When both flags 33 and 34 are set, indicating that the file 30 is in a consistent state suitable for a backup, the backup control program sequences to step 82, in which it retrieves the contents of the first entry in the current file sectors segment 41 of the extent map 40 defining the locations on disk of the file. If the file extends across several disks, it will be appreciated that the backup control program will initially use the extent map of the disk containing the first portion of the file, and later use extent maps associated with disks containing other portions of the file.

In any event, after retrieving the first entry 43 from the current file sectors segment 41 of the disk extent map, the backup control program determines the portions of the file represented by the contents of the storage locations which are identified by the entry 43 (step 83), and then determines, from the contents of field 47 in the entries 46 in backup file sectors segment 42 of the extent map 40, whether any of those portion of the file have been updated (step 84). The backup control program then sequences to step 85, in which it backs up the portion of the file identified by the entry 43 in the current file sectors segment 41, substituting the contents of storage locations identified by entries in the backup file sectors segment 42 for particular storage locations identified by the entry 43 identified by field 47 in an entry 46 in the backup file sectors segment 42.

Following step 85, the backup control program sequences to step 86, in which it determines whether all of the entries 43 in the current file sectors segment 41 of the extent map 40 have been processed, that is, backed up using steps 82 through 85. If they have not been, the backup control program returns to step 82 to process the next entry 43. It will be appreciated that, if a file is spread across several disks, the backup control program will process, using steps 82 through 85, entries 43 in extent maps 40 associated with each of the disks. After all entries 43 in all of the extent maps 40 of all disks containing segments of the file 30 have been processed, in step 86 the backup control program will sequences to step 87, in which it sets the consistent state done flag in the header 31 of the file 30 and exits (step 88). Following step 88, as depicted on FIG. 4A, the file management system may reset all of flags 33 through 35.

The file management system has been described, in step 73 (FIG. 4B) as copying existing portions of the file during an update operation to other storage locations, to preserve them for a backup, and the backup control program has been described, in step 85, as substituting the preserved portions during the backup operation. It will be appreciated that, alternatively, the file management system may store the updates in other storage locations on the disk and update the entries 43 in the current file sectors segment 41 to identify the update, as well as provide appropriate entries 46 in the backup file sectors segment 42 to identify the original portions of the file. In this case, the backup control program uses the contents of the entries 46 in the backup file sectors segment 42 as described in connection with FIG. 4C to identify storage locations containing data in the file which has been updated. In this alternative, since the updated locations whose contents are backed up are adjacent to other locations to be backed up, but whose contents have not been updated, the backup will proceed more quickly. However, normal usage of the file is likely to be less convenient and require more time, since the file is more fragmented with the updated portions being scattered over the disk.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A file backup system for performing a backup operation on portions of a file stored in a memory and simultaneously permitting updates to be made to said file during said backup operation, said file backup system comprising:

a map for identifying said portions of said file, file update means for performing an update operation on at least one of said portions during said backup operation on said at least one of said portions, said file update means comprising means for retaining a nonupdated version of said at least one of said portions as said portion existed when said update operation began so that said nonupdated version of said portion can be backed-up during said update operation, said file update means storing said nonupdated version of said portion in a storage location in said memory that is different from a storage location of a version of said at least one of said portions on which said update operation is being performed, said file update means causing said map to indicate that said at least one of said portions is being updated and to identify said storage location of said nonupdated version of said at least one of said portions, and file backup means for using said map to identify each portion of said file that is being updated and determine the storage location of the corresponding nonupdated version of said portion in said memory, said file backup means performing said backup operation on said nonupdated version of said portion so that said file update means can simultaneously continue to perform said update operation on said portion without interrupting or interfering with said backup operation.

2. A file backup system as defined in claim 1 wherein said map includes an original file identification portion having a plurality of entries each of which identifies a storage location of one of said portions of said file, and an update file identification portion having entries each of which identifies one of said portions of said file that is being updated, said file update means including:

A. file portion update means for performing said update operation on a selected portion of said file and storing the version of said portion on which said update operation is performed in a selected storage location in said memory; and B. means responsive to said file portion update means performing said update operation for establishing an entry in said update file identification portion that corresponds to said selected portion of said file and identifies said selected storage location of said version of said portion on which said update operation is performed and the storage location of the nonupdated version of said portion.

3. A file backup system as defined in claim 2 wherein said portions of said file are maintained in a plurality of storage locations each identified by one of said entries in said original file identification portion of said map, said file portion update means including means responsive to initiation of said update operation on said selected portion of said file for transferring a copy of the selected portion of said file from a first storage location to a second storage location, performing said update operation on said selected portion and storing the version of said selected portion on which said update operation is performed in said first storage location, and establishing an entry in said update file identification portion of said map to identify that said nonupdated version of said selected portion is stored in said second storage location.

4. A file backup system as defined in claim 2 wherein said portions of said file are maintained in a plurality of storage locations each identified by one of said entries in said original file identification portion of said map, said file portion update means including means responsive to initiation of said update operation on said selected portion of said file stored in a first location for storing said version of said selected portion on which said update operation is performed in a second storage location and establishing an entry in said original file identification portion of said map to identify said second storage location.

5. A file backup system as defined in claim 2 wherein said portions of said file are stored at sequential storage locations in said memory, said file update means storing said versions of said portions on which said update operation is performed in said sequential storage locations and storing said nonupdated versions of said portions in nonsequential storage locations in said memory, said file backup means including:

A. original portion processing means for iteratively retrieving entries from said original file identification portion of said map to locate said sequential storage locations of said portions of said file;

B. update portion processing means responsive to said original portion processing means retrieving an entry from said original file identification portion for processing said entries in said update file identification portion to identify portions of said file which are being updated and which have nonupdated versions stored in said nonsequential storage locations; and C. backup processing means responsive to said original portion processing means and said update portion processing means for performing said backup operation on said sequentially stored portions of said file as identified by each retrieved entry from said current file identification portion, said backup processing means substituting portions of said file which are being updated as identified by said update portion processing means with nonupdated portions stored at said nonsequential storage locations.

6. A file update system as defined in claim 2 wherein said portions of said file are maintained in a plurality of storage locations each identified by one of said entries in said original file identification portion of said map, said file portion update means including means responsive to initiation of said update operation on said selected portion of said file stored in a first location for storing said version of said selected portion on which said update operation is performed in a second storage location and establishing an entry in said original file identification portion of said map to identify said second storage location.

7. A file backup system as defined in claim 1 wherein said file includes a file status request flag means and file status achieved flag means, said file backup means including means for setting said file status request flag means, said file update means including means responsive to said file status request flag means being set for performing a processing operation in connection with said file and setting said file status achieved flag means, said file backup means being responsive to the file status request flag means for thereafter performing said backup operation.

8. A file backup system as defined in claim 7 wherein said file further includes file status done flag means, said file backup means including means for setting said file status done flag means in response to termination of said backup operation.

9. A file backup system as defined in claim 8 wherein said file update means further includes means responsive to said file status done flag means being set for resetting said file status request flag means, said file status achieved flag means, and said file status done flag means.

10. The file backup system of claim 1 wherein said one portion is stored at a first location in said memory and said map identifies said first location, said file update means being adapted to copy said one portion to a second location in said memory, store said version of said one portion on which said update operation is performed at said first location, and modify said map to identify that said nonupdated version of said one portion is stored at said second storage location, whereby said file backup means performs said backup operation on said one portion stored at said second storage location.

11. The file backup system of claim 1 wherein said one portion is stored at a first location in said memory and said map identifies said first location, said file update means being adapted to copy said one portion to a second location in said memory, store said version of said one portion on which said update operation is performed at said second location, and modify said map to identify that said version of said one portion on which said update operation is performed is stored at said second storage location, whereby said file backup means performs said backup operation on said one portion stored at said first storage location.

12. A method of performing a backup operation on portions of a file stored in a memory and simultaneously permitting updates to be made to said file during said backup operation, said file backup method comprising:
identifying said portions of said file with a map,
performing an update operation on at least one of said portions during said backup operation on said at least one of said portions, and retaining a nonupdated version of said at least one of said portions as said portion existed when said update operation began so that said nonupdated version of said portion can be backed-up during said update operation,
storing said nonupdated version of said at least one of said portions in a storage location in said memory that is different from a storage location of a version of said at least one of said portions on which said update operation is being performed,
causing said map to indicate that said at least one of said portions is being updated and to identify a storage location of said nonupdated version of said portion,
using said map to identify each portion of said file that is being updated and determine the storage location of the corresponding nonupdated version of said portion in said memory, and
performing said backup operation on said nonupdated version of said portion so that said update operation can simulataneously continue to be performed on said portion without interrupting or interfering with said backup operation.

13. The method claim 12 wherein said one portion is stored at a first location in said memory and said map identifies said first location, said step of performing said update operation further comprising
copying said one portion to a second location in said memory,
storing said version of said one portion on which said update operation is performed at said first location, and
modifying said map to identify that said nonupdated version of said one portion is stored at said second storage location, whereby said backup operation is performed on said one portion stored at said second storage location.

14. The method of claim 12 wherein said one portion is stored at a first location in said memory and said map identifies said first location, said step of performing said update operation further comprising
copying said one portion to a second location in said memory,
storing said version of said one portion on which said update operation is performed at said second location, and
modifying said map to identify said that said version of said one portion on which said update operation is performed is stored at said second storage location, whereby backup operation is performed on said one portion stored at said first storage location.

15. A file update system for use with a file backup system that performs a backup operation on portions of a file stored in a memory and simultaneously permits updates to be made to said file during said backup operation,
said file backup system comprising a map that includes an original file identification portion having a plurality of entries each of which identifies a storage location of one of said portions of said file,
said file update system comprising:
A. file portion update means for performing said update operation on a selected portion of said file stored at a first said storage location during said backup operation on said selected portion, said file update means comprising means for retaining a nonupdated version of said selected portion as said selected portion existed when said update operation began so that said nonupdated version of said selected portion can be backed-up during said update operation, said file portion update means storing said nonupdated version of said portion at said first storage location in said memory, said file portion update means performing said update operation on a version of said selected portion that is stored in a selected storage location in said memory that is different from said first storage location; and B. means responsive to said file portion update means performing said update operation for establishing an entry in an update file identification portion of said map, said entry corresponding to said selected portion of said file and identifying said selected storage location of said version of said portion on which said update operation is being performed and said first storage location of the nonupdated version of said portion;

said file backup system further comprising file backup means for using said map to identify each portion of said file that is being updated by said file update system and determine a storage location of a corresponding nonupdated version of said portion in said memory, said file backup means performing said backup operation on said nonupdated version of said portion so that said file update system can simultaneously continue performing said update operation on said portion without interrupting or interfering with said backup operation.

16. A file update system as defined in claim 15 wherein said portions of said file are maintained in a plurality of storage locations each identified by one of said entries in said original file identification portion of said map, said file portion update means including means responsive to initiation of said update operation on said selected portion of said file for transferring a copy of the selected portion of said file from a first storage location to a second storage location, performing said update operation on said selected portion and storing the updated version of said selected portion in said first storage location, and establishing an entry in said update file identification portion of said map to identify that said nonupdated version of said selected portion is stored in said second storage location.

* * * * *